United States Patent [19]

Nishikata

[11] Patent Number: 5,630,480

[45] Date of Patent: May 20, 1997

[54] ACCELERATION SLIP CONTROL SYSTEM FOR A MOTOR VEHICLE

[75] Inventor: Hirohito Nishikata, Susono, Japan

[73] Assignee: Toyota Jidosha Kabushiki Kaisha, Toyota, Japan

[21] Appl. No.: 506,561

[22] Filed: Jul. 25, 1995

[30] Foreign Application Priority Data

Aug. 8, 1994 [JP] Japan ..................... 6-185823

[51] Int. Cl.$^6$ ................................. B60K 28/16
[52] U.S. Cl. .................... 180/197; 364/426.032; 364/426.028; 303/142
[58] Field of Search .............. 180/197; 364/426.03, 364/426.01, 424.01, 423.098, 426.015, 426.018, 426.023, 426.027, 426.028, 426.029, 426.032; 303/139, 142, 145; 123/332, 333, 481

[56] References Cited

U.S. PATENT DOCUMENTS 5,025,881  6/1991  Poirier et al. ..................... 180/197
5,155,686  10/1992  Shiraishi et al. ..................... 180/197 X
5,320,422  6/1994  Tsuyama et al. ..................... 180/197 X

FOREIGN PATENT DOCUMENTS 1-249557  10/1989  Japan .
3-246334  11/1991  Japan .
3-246335  11/1991  Japan .

*Primary Examiner*—Brian L. Johnson
*Assistant Examiner*—Victor E. Johnson
*Attorney, Agent, or Firm*—Oliff & Berridge

[57] ABSTRACT

An acceleration slip control system for a motor vehicle, comprising a "fuel-cut number" alteration restraint device (in FIG. 1) for restraining the alteration of the number of those cylinders of the engine of the motor vehicle to which fuel is to be cut off. When the fluctuating magnitude of the reduction of the torque of the engine as based on an actual engine torque and a target engine torque falls within a predetermined range which can be coped with by a brake control, the "fuel-cut number" alteration restraint device inhibits the alteration of the "fuel-cut number". Thus, frequence in the change of the "fuel-cut number" is lowered to prevent the temperature rise of a catalyst which is mounted in the motor vehicle.

2 Claims, 6 Drawing Sheets

ACCELERATION SLIP CONTROL SYSTEM FOR A MOTOR VEHICLE

BACKGROUND OF THE INVENTION

1. Field of the Invention

The present invention relates to a slip control for a motor vehicle. More particularly, it relates to an acceleration slip control system for a motor vehicle which suppresses a slip arising in the driving wheel of the motor vehicle during the acceleration thereof.

2. Description of the Related Art

There have heretofore been control systems in each of which, when the driving wheel of the motor vehicle has undergone a slip in the acceleration mode thereof, an engine output or a brake force is controlled to suppress the slip.

As the control system based on the engine output, for example, There have been a driving force control system for a motor vehicle as disclosed in the official gazette of Japanese Patent Application Laid-open No. 246335/1991. In this system, when the slip of the driving wheel has been detected, the driving force of the motor vehicle is controlled in such a way that, in order to reduce the engine output, the basic or fundamental fuel injection quantity is immediately corrected so as to cut the supply of fuel (to actualize "fuel-cut") under a condition which is predetermined for each cylinder in accordance with a slip ratio measured between a tire and a road surface.

In general, in the case where the fuel supply is cut, due to air which has passed through the cylinder subjected to the fuel-cut, unburnt gas emitted from any other cylinder is burnt within a catalyst. Accordingly, there is the problem that the temperature of the catalyst is liable to rise. Therefore, when the engine output control continues for a long time period, the damage of the catalyst is apprehended. Also in the system of Japanese Patent Application Laid-open No. 246335/1991, the fuel-cut control is interrupted for the protection of the catalyst when the catalyst temperature has reached a predetermined value.

Besides, in resetting the fuel supply operation from the fuel-cut mode, the so-called "resetting quantity increase" of the fuel is usually carried out to inject the fuel more than in the continuous injection mode of this fuel supply operation. Therefore, in the case where the number of cylinders to have the fuel cut off (hereinbelow, simply termed the "fuel-cut number" or "FCN") changes frequently, the fuel-cut and the reset are repeated frequently. This poses the problem that the temperature of the catalyst is more liable to rise.

SUMMARY OF THE INVENTION

The present invention has been made in order to solve the problems of the prior art as stated above, and has for its object to provide an acceleration slip control system for a motor vehicle in which frequency of a "fuel-cut" control and frequency of the change of a "fuel-cut number" are lowered to control the slip of a driving wheel stably, and to prevent the temperature of the catalyst from rising.

The principles of the present invention are illustrated in FIG. 1. As shown in the figure, according to the present invention, in an acceleration slip control system for a motor vehicle which suppresses a slip of a driving wheel in an acceleration mode of the motor vehicle, the system comprises brake control device for suppressing the slip of the driving wheel; engine torque detection device for detecting a torque of an engine of the motor vehicle under running; target engine torque setting device for setting a target engine torque according to a running state, etc. of the motor vehicle; "fuel-cut number" setting device for setting the number of those cylinders of the engine to which fuel is to be cut off, in accordance with the detected engine torque and the set target engine torque in order to reduce the engine torque; and "fuel-cut number" alteration restraint device for restraining alteration of the "fuel-cut number" when a fluctuating magnitude of the engine torque reduction falls within a predetermined range which can be coped with by the brake control device.

As also shown in the same figure, the acceleration slip control system for a motor vehicle may well further comprise temperature detection device for detecting a temperature of a brake pad of said brake control device, in order that the predetermined range (in said "fuel-cut number" alteration restraint device) which can be coped with by the brake control device is set according to the temperature of the brake pad of the brake control device.

In operation, according to the present invention, the engine torque of the engine of the motor vehicle under running is detected by the engine torque detection device, the target engine torque is set according to a road surface state, etc. by the target engine torque setting device, the number of the cylinders to which the fuel is to be cut off is set according to the detected engine torque and the set target engine torque by the "fuel-cut number" setting device in order to effect the predetermined engine torque reduction, and the "fuel-cut" control of the cylinders is carried out, whereby the output of the engine is lowered to suppress the slip of the driving wheel. On that occasion, when the fluctuating magnitude of the predetermined engine torque reduction falls within the predetermined range which can be coped with by the brake control device, the alteration of the "fuel-cut number" is restrained by the "fuel-cut number" alteration restraint device, and the brake of the driving wheel is applied by the brake control device, whereby the slip of the driving wheel can be suppressed. Thus, the "fuel-cut number" can be prevented from changing frequently, and the fuel-cut mode and the reset mode of the fuel supply operation can be prevented from repeating frequently, so that the driving wheel slip can be avoided without excessive rising the temperature of the catalyst.

Meanwhile, in the case where the torque fluctuation component within the range within which the change of the "fuel-cut number" is restrained is to be compensated by the brake control, the load of the brake control device becomes heavier to that extent, and hence, the temperature of the brake pad becomes liable to rise. In this regard, the brake pad temperature is detected by the brake pad temperature detection device, and the "range which can be coped with by the brake control device" in the "fuel-cut number" alteration restraint device is set according to the detected temperature. By way of example, when the brake pad temperature has exceeded a predetermined point, the "fuel-cut" restraint range is narrowed. Thus, the load of the brake can be lightened, and the abnormal heating of the brake pad can be avoided.

Incidentally, the words "engine torque detection device (means)" or the "brake pad temperature detection device (means)" mentioned above shall cover, not only a device for actually detecting the engine torque or the brake pad temperature by means of an engine torque sensor or a temperature sensor, but also a device for indirectly detecting the engine torque or the brake pad temperature through a calculation, a map search or the like based on the detection of any other parameter or parameters.

Moreover, the word "restraint" of the alteration of the "fuel-cut number" shall cover, not only the concept of the "overall inhibition" of the alteration, but also the concept of the "partial inhibition" thereof.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Now, the embodiments of the present invention will be described in detail with reference to the drawings.

Figure 1:
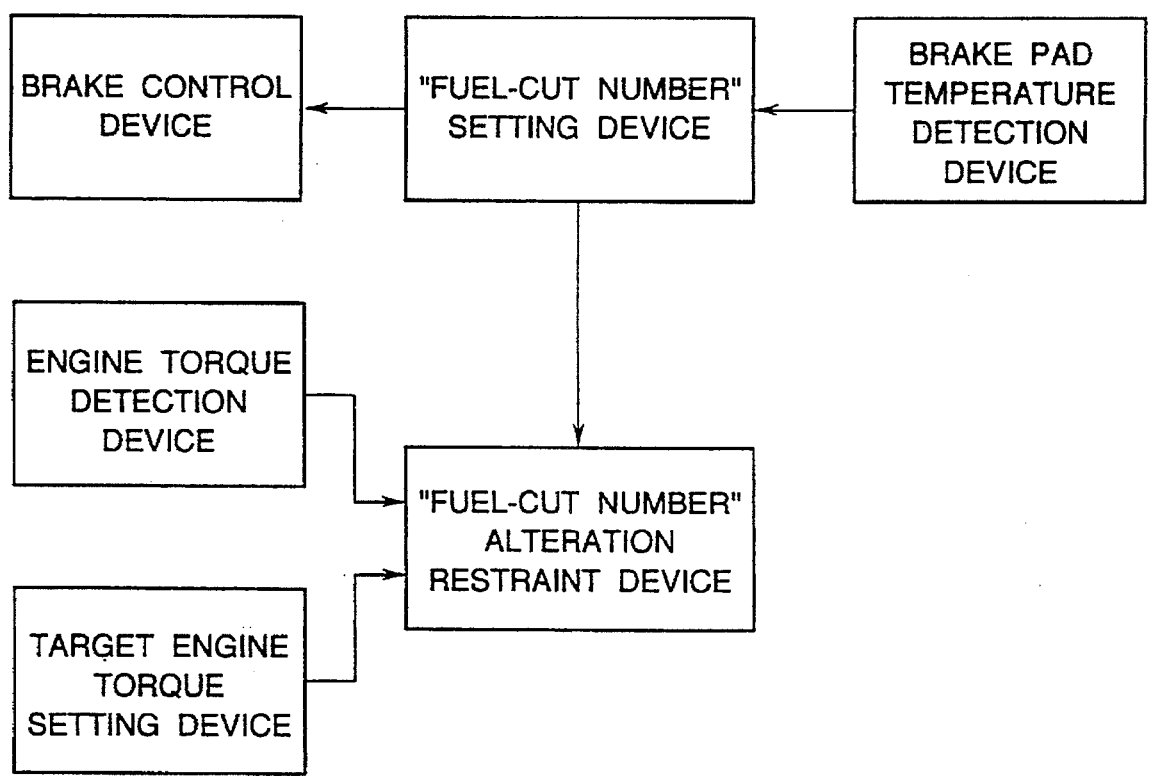
FIG. 1 is a block diagram showing the principles of the present invention.
Figure 2:
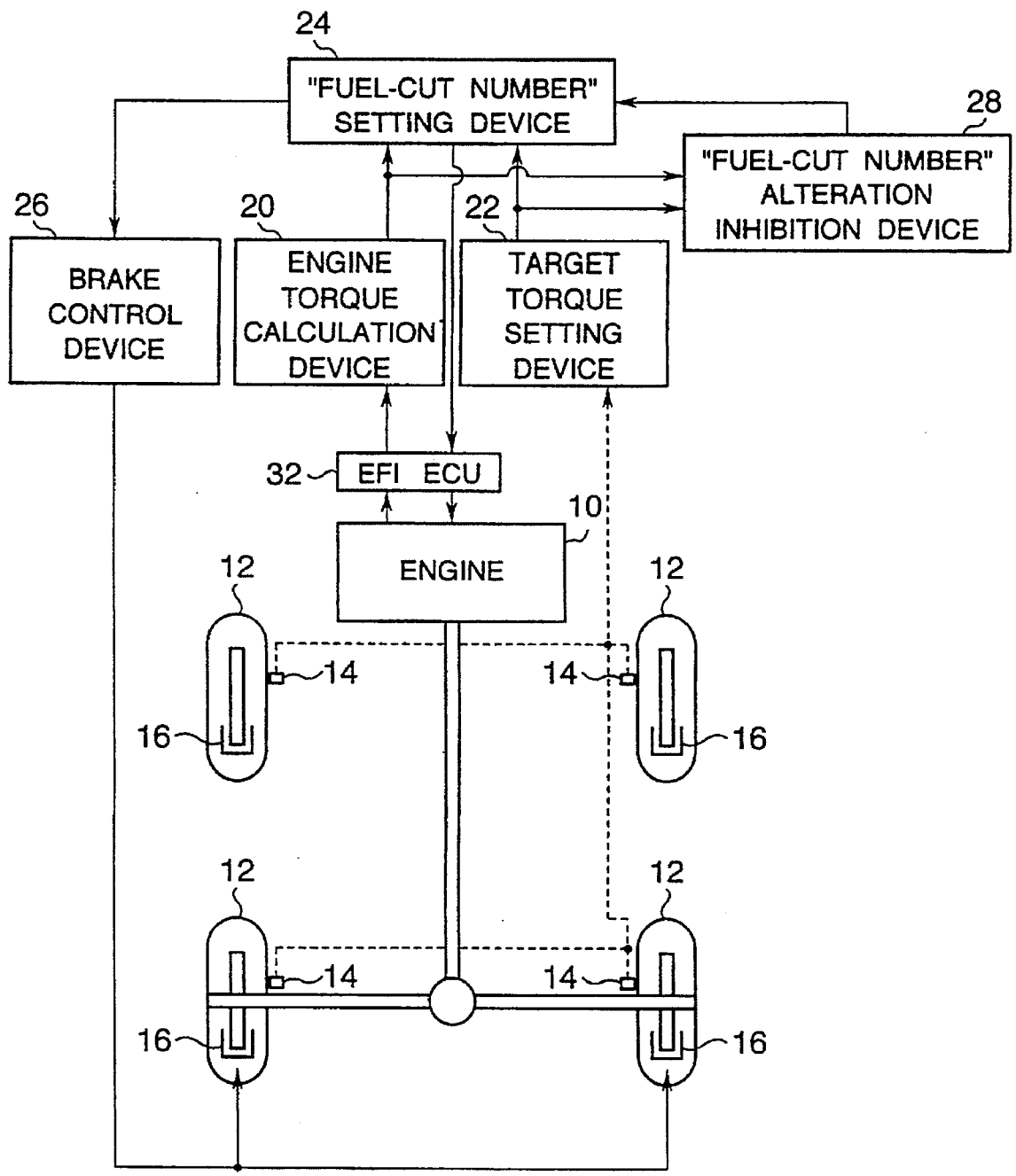
FIG. 2 is a system architecture diagram showing the outlines of the first embodiment of the present invention.

FIG. 2 is a system architecture diagram showing the outlines of an acceleration slip control system for a motor vehicle in the first embodiment of the present invention.

Referring to FIG. 2, the motor vehicle has an engine 10, tires 12, wheel speed sensors 14 for detecting the rpm (revolutions per minute) of respective wheels, and wheel brakes 16. Numeral 32 designates engine control device for controlling the engine 10. Herein, the engine control device 32 is an ECU (electronic control unit) adapted to carry out EFI (electronic fuel injection).

The ECU 32 also cuts the supply of fuel to the predetermined cylinders of the engine 10 in accordance with the number of cylinders set by the "fuel-cut number" setting device 24 to be explained later. The engine torque calculation device 20 calculates the engine torque of the motor vehicle which is currently running, according to signals from ECU 32. The target engine torque setting device 22 calculates a target engine torque from the speeds of the driving wheels of the motor vehicle and the accelerations of the driven wheels thereof as detected by the wheel speed sensors 14. The "fuel-cut number" setting device 24 calculates the number of the cylinders to which the fuel is to be cut off for the purpose of reducing the engine torque of the motor vehicle, from the actual engine torque calculated by the engine torque calculation device 20 and the target engine torque set by the target engine torque setting device 22. A brake control device 26 brakes the driving wheels separately from a driver's braking movement so as to suppress the slip of the driving wheel in the acceleration mode of the motor vehicle. The brake control device 26 has a construction which is known in itself. The "fuel-cut number" alteration inhibition device 28 inhibits the alteration of the "fuel-cut number" on condition that the fluctuating magnitude of the engine torque reduction based on both the actual and target torques falls within a predetermined range which can be coped with by the brake control device 26.

Figure 3:
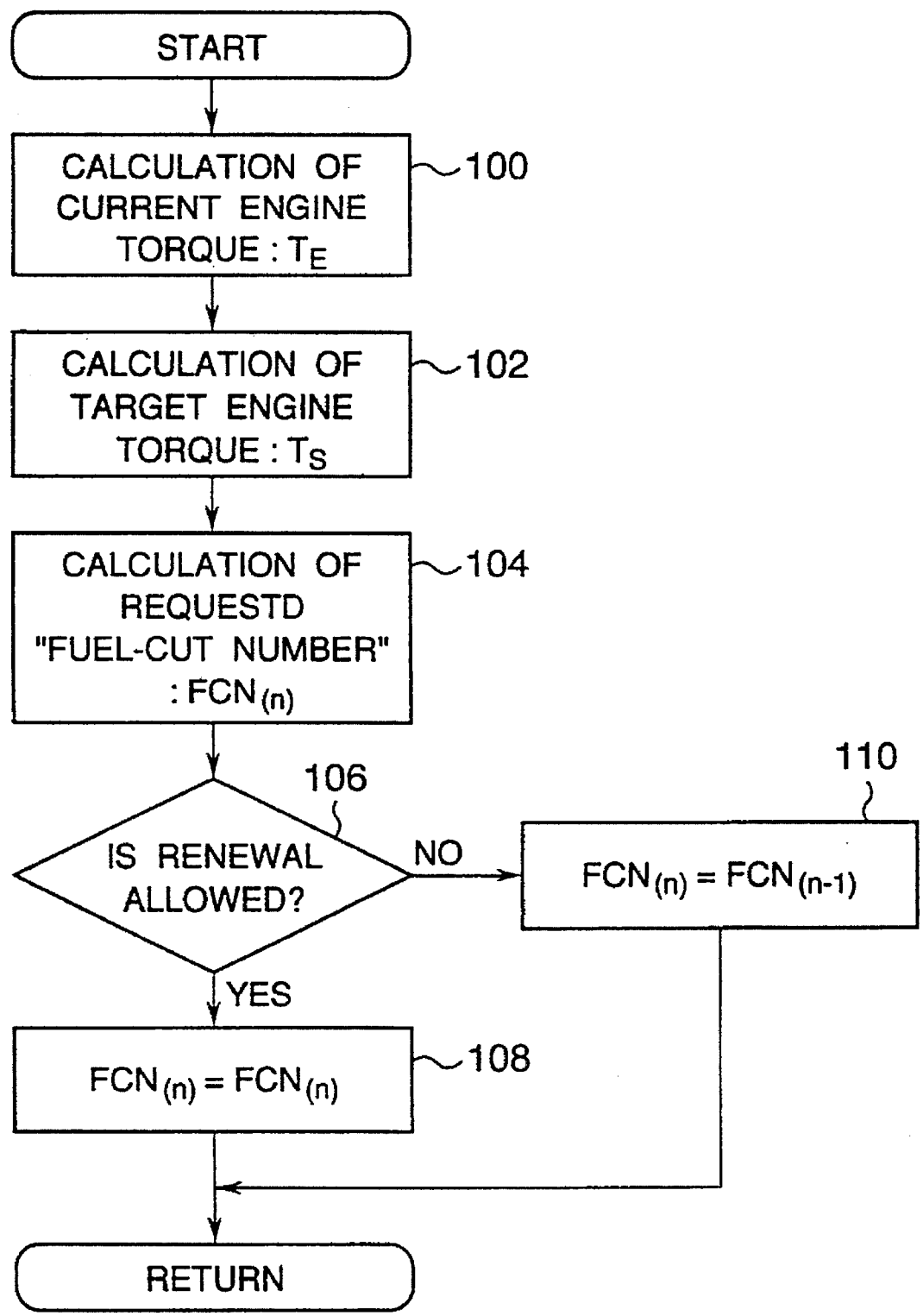
FIG. 3 is a flow chart showing an acceleration slip control based on the first embodiment.

FIG. 3 is a flow chart which shows the control of the first embodiment, and the operation of this embodiment will be described below with the flow-chart.

First, at a step 100, the current engine torque TE of the motor vehicle is obtained from the map of the throttle angle and the rpm of the engine in the engine torque calculation device 20. Naturally, the engine torque TE may well be detected directly by a sensor.

Besides, at a step 102, the target engine torque TS is calculated using a slip magnitude obtained from the speeds of the driving wheels, the accelerations of the driven wheels, etc., in the target engine torque setting device 22.

At the next step 104, the "fuel-cut number" setting device 24 compares the current engine torque TE and the target engine torque TS which are obtained above, and then calculates the necessary fuel-cut number FCN(n). Here, the letter of "n" in the fuel-cut number FCN(n) indicates a number of times of the routine. The number of times "n" is set to 1 (n=1) when the ignition switch of the motor vehicle has been turned "ON", and is counted up 1 (one) each time the "fuel-cut" control conforming to this flow chart is executed.

In the prior-art control, the "fuel-cut" directly proceeds in accordance with the result of the above calculation at the step 104. In contrast, in this embodiment, it is determined here whether the fuel-cut number FCN(n) is to be renewed or not.

More specifically, at a step 106, if the fluctuating magnitude of the reduction quantity $\Delta T(n)$ of the engine torque as based on both the torques TE and TS does not fall within the predetermined range which can be coped with by the brake control device 26, then the renewal is determined.

Concretely, this determination is rendered as explained below. Letting KFC ($0 < KFC \leq 1.0$) denote the weighting factor of the brake control as well as the fuel-cut control, the reduction quantity $\Delta T(n)$ of the engine torque as based on both the torques TE and TS is defined by the following equation (1):

$$\Delta T(n) = KFC \times (TE(n) - TS(n)) \quad (1)$$

The renewal is allowed when the reduction quantity $\Delta T(n)$ in the current routine of the control satisfies the following inequality (2) or (3) with respect to the reduction quantity $\Delta T(n-1)$ in the last routine:

$$\Delta T(n) > \Delta T(n-1) + A \quad (2)$$

$$\Delta T(n) < \Delta T(n-1) - B \quad (3)$$

Here, letters A and B indicate constants which satisfy the following inequality (4):

$$A + B < (1 - KFC) \times (TEmax) \text{ TEBmax: Braking torque at the maximum controlling hydraulic pressure in the brake control device 26} \quad (4)$$

In a case where Ineq. (2) holds, that is, where the reduction quantity $\Delta T(n)$ of the current routine has become larger than the reduction quantity $\Delta T(n-1)$ of the last routine in excess of the constant A, the fuel-cut number FCN(n) is increased. On the other hand, in a case where Ineq. (3) holds, that is, where the reduction quantity $\Delta T(n)$ of the current routine has become smaller than the reduction quantity $\Delta T(n-1)$ of the last routine in excess of the constant B, the fuel-cut number FCN(n) is decreased.

Besides, when neither of Ineqs. (2) and (3) holds, that is, when the reduction quantity ΔT(n) of the current routine falls within the fluctuation range of (A+B) consisting of the width A on the increase side and the width B on the decrease side, as compared with the reduction quantity ΔT(n−1) of the last routine, the renewal of the fuel-cut number FCN(n) is not allowed, and the alteration thereof is inhibited by the "fuel-cut number" alteration inhibition device 28.

The range of (A+B) shall be called the "dead zone", because, if the fluctuation component of the reduction quantity ΔT(n) falls within the range of (A+B), then the alteration of the fuel-cut number FCN(n) is not allowed.

Figure 4:
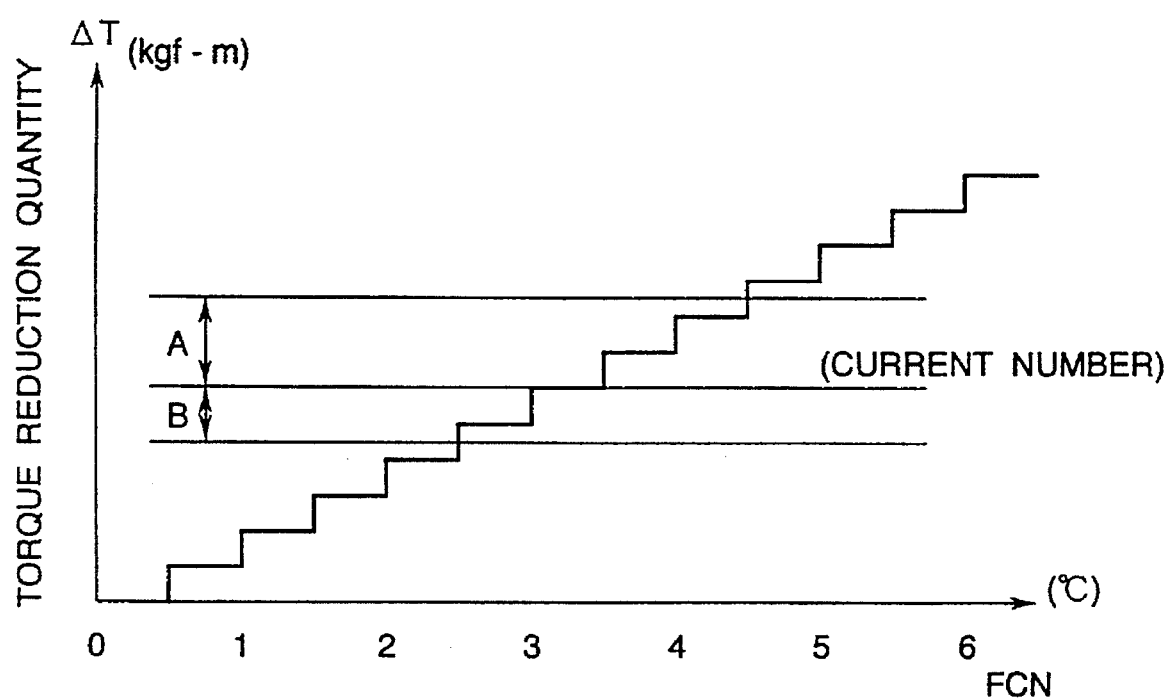
FIG. 4 is a graph showing an example of the setting of a dead zone in which the change of the "fuel-cut number" is inhibited.

FIG. 4 illustrates a practicable example of the setting of the dead zone. In the illustrated example, the fuel-cut is controlled with 0.5-cylinder resolving precision by thinning out or canceling one of two fuel injection timings. In the situation of FIG. 4, three cylinders are being currently subjected to the fuel-cut control. FIG. 4 shows that, the fuel-cut number FCN(n) is renewed only when the fuel-cut number larger than 4.5 on the increase side or the fuel-cut number smaller than 2.5 on the decrease side has been requested.

Referring back to FIG. 3, when the renewal has been allowed at the step 106, the fuel-cut number FCN(n) calculated anew is set at a step 108, and the fuel-cut control is carried out in conformity with the new fuel-cut number FCN(n).

On the other hand, in a case where the renewal has not been allowed, at the step 106 (that is, where the fluctuation component of the torque reduction quantity ΔT(n) falls within the dead zone), the flow of the control proceeds to a step 110, at which the fuel-cut number FCN(n−1) of the last routine is continuously set as the new fuel-cut number FCN(n) without any change. On this occasion, owing to the brake control of the brake control device 26, the rotation of the driving wheel is restrained more by the increase of a braking force when the request on the increase side of the fuel-cut number has been rejected, and the rotation of the driving wheel is restrained less by the decrease of the braking force when the request on the decrease side of the fuel-cut number has been rejected. Accordingly, the values of the constants A and B are respectively set taking it into consideration that the braking force is already exerted at the current point of time.

By the way, the method of calculation of the target engine torque TS is not restricted to that of computing this torque TS from the slip magnitude obtained from the speeds of the driving wheels, the accelerations of the driven wheels, etc. as explained above, but the torque TS may well be computed from the friction factor μ (linear μ) of a road surface which has been obtained from the increment of the speed of the motor vehicle or by a G-sensor or the like.

Next, the second embodiment of the present invention will be described. In this embodiment, the allowance of renewal is determined by another method.

Figure 5:
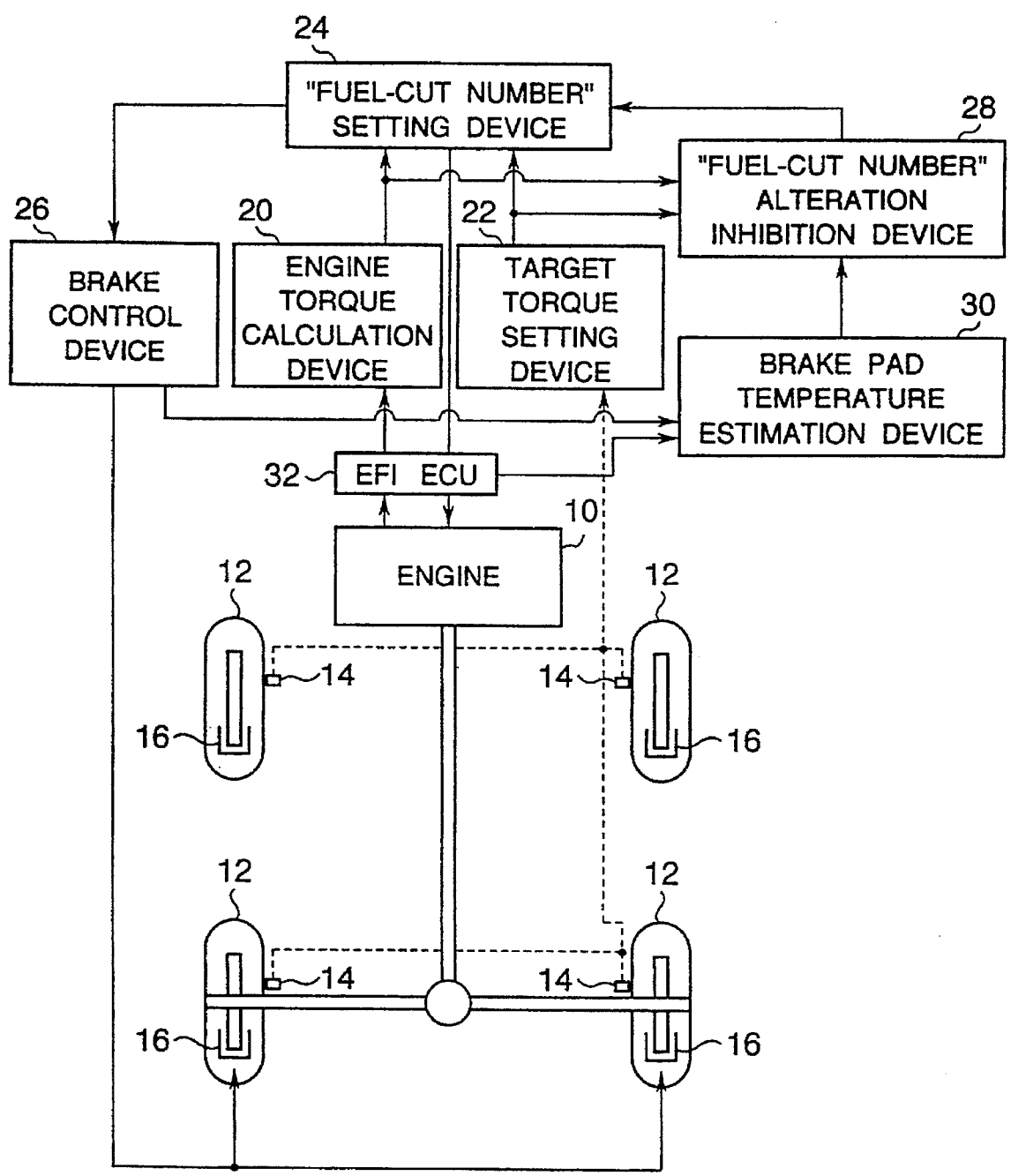
FIG. 5 is a system architecture diagram showing the outlines of the second embodiment of the present invention.

FIG. 5 illustrates the schematic architecture of the second embodiment.

In the fuel-cut control, If the dead zone is set and the brake is controlled with the renewal of the fuel-cut number inhibited in the case where the reduction quantity of the engine torque falls within the dead zone, then the load of the brake is enlarged, and the temperature of a brake pad is liable to rise, which decreases a braking torque under an identical hydraulic pressure.

In the second embodiment, therefore, the load of the brake is lightened in such a way that brake pad temperature estimation device 30 is further added to the first embodiment shown in FIG. 2, so as to change the dead zone in accordance with the temperature of the brake pad.

Figure 6:
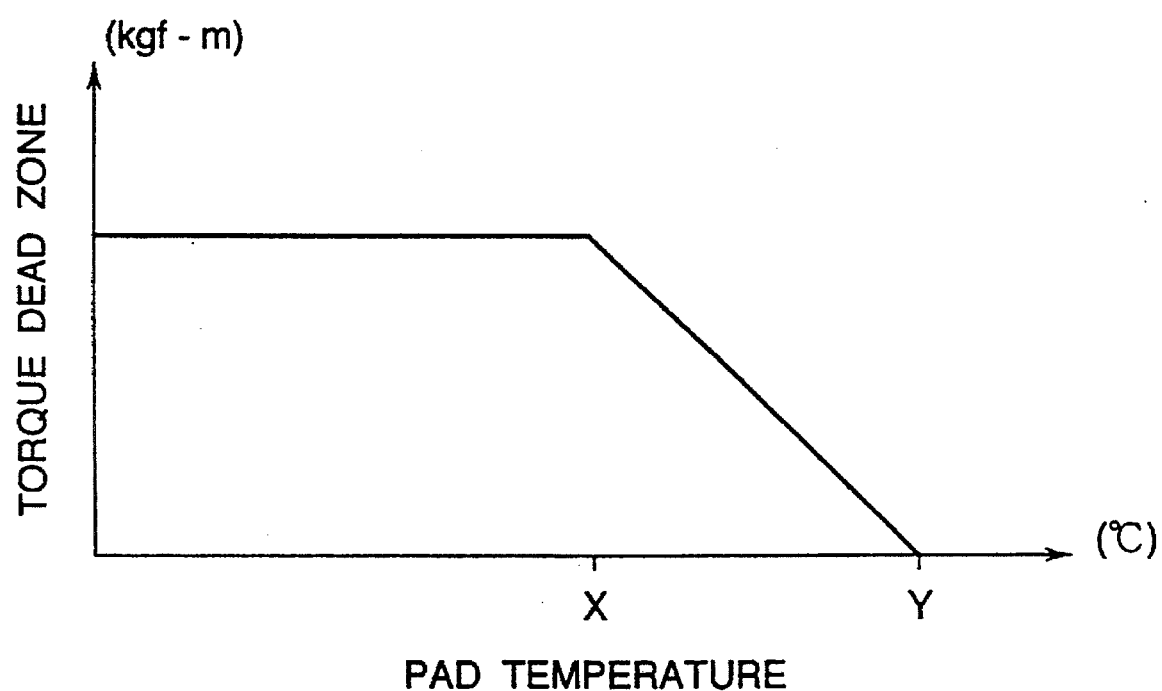
FIG. 6 is a graph showing the situation of the second embodiment where a dead zone is changed depending upon brake pad temperatures.

More specifically, the brake pad temperature is estimated by the brake pad temperature estimation device 30 when the renewal allowance is determined at the step 106 in FIG. 3, and the value of the dead zone (A+B) is changed depending upon the values of the brake pad temperature as shown in FIG. 6.

FIG. 6 illustrates an example of the setting of the fuel-cut dead zone based on the brake pad temperature in the second embodiment. As shown in the figure, the dead zone is held at a constant value up to a brake pad temperature value of X [°C.], and it is changed from the constant value to 0 (zero) between brake pad temperature values X [°C.] and Y [°C.]. In this manner, when the brake pad temperature has exceeded the certain point X [°C.], the dead zone is narrowed. Thus, the rate at which the brake control device 26 commits the fuel-cut control can be lessened to lighten the load of the brake.

Incidentally, at any point higher than Y [°C.], since the brake pad temperature is too high, a traction control with the brake is inhibited in order to prevent the brake from fading.

Here, a technique for estimating the brake pad temperature will be explained. In this regard, there is an undisclosed Japanese patent application (Japanese Patent Application No. 257256/1993) filed by the assignee of the present application.

First, when the ignition switch of the motor vehicle has been turned "ON", a predetermined value or the output value of an open-air temperature sensor, for example, is set as the initial value of the brake pad temperature. On the other hand, during the running of the motor vehicle, the temperature rise of the brake pad attributed to the work of the brake control device 26 is calculated from a braking force, a wheel speed, etc. Furthermore, the temperature rise thereof attributed to ordinary braking performed by a driver's movement is calculated from a braking initial velocity, a braking terminal velocity, etc. Incidentally, the cooling component of the brake pad temperature for a time period for which no braking is effected is also evaluated in accordance with a predetermined calculation formula. The calculated rising components of the pad temperature are added to the initial value of the brake pad temperature, and the temperature falling component based on the cooling of the brake pad is subtracted from the same, whereby the brake pad temperature is estimated. Afterward, similar processing is executed to update the estimated temperature. Thus, the estimated value of the brake pad temperature on each occasion is always obtained.

By the way, the estimation or detection of the brake pad temperature is not restricted to such an estimating method, but any other estimating method may well be adopted. Naturally, the brake pad temperature may well be directly detected by mounting a temperature sensor on the brake.

Previously stated, in each of the first and second embodiments, the constants A and B in the dead zone (A+B) can be set at the values differing from each other. Further, besides the second embodiment, the value (A+B) can also be altered depending upon any other condition. The respective values in these cases are determined in consideration of the responsibility, stability and accelerating power of the motor vehicle, the temperature of a catalyst, the degree of deterioration in emission, and so forth, within the limit of a braking torque attained by the maximum braking hydraulic pressure in the brake control device 26 (for braking the driving wheels independently of the driver's braking movement).

The present invention thus described brings forth effects as stated below.

Since frequence in the change of the "fuel-cut number" is lowered, the rise of a catalyst temperature can be avoided.

Moreover, in a case where the range in which the change of the "fuel-cut number" is restrained is changed in accordance with a brake pad temperature, the abnormal heating of brake control device can be effectively suppressed.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. An acceleration slip control system for a motor vehicle which suppresses a slip of a driving wheel in an acceleration mode of said motor vehicle, comprising:

brake control means for suppressing said slip of the driving wheel in a predetermined range;

engine torque detection means for detecting a torque of an engine of said motor vehicle under running;

target engine torque setting means for setting a target engine torque according to a running state of said motor vehicle;

fuel-cut number setting means for setting a number of cylinders of the engine to which fuel is to be cut off, in accordance with said detected engine torque and said set target engine torque in order to reduce engine torque toward said set target engine torque; and fuel-cut number alteration restraint means for restraining alteration of the fuel-cut number when a fluctuating magnitude of a difference between said detected engine torque and said set target engine torque falls within said predetermined range of said brake control means.

2. An acceleration slip control system for a motor vehicle as defined in claim 1, further comprising temperature detection means for detecting a temperature of a brake pad of said brake control means, in order that said predetermined range is set according to said temperature of the brake pad of the brake control means.

* * * * *